(12) United States Patent
Stone et al.

(10) Patent No.: US 7,891,319 B2
(45) Date of Patent: *Feb. 22, 2011

(54) LIQUID BIRD FEEDER

(75) Inventors: John Stone, Southboro, MA (US); Oliver McLachlan, Boston, MA (US); David Harting, Needham, MA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,262

(22) Filed: Oct. 8, 2009

(65) Prior Publication Data

US 2010/0132618 A1    Jun. 3, 2010

Related U.S. Application Data

(63) Continuation of application No. 11/434,020, filed on May 15, 2006, now Pat. No. 7,600,487.

(51) Int. Cl.
*A01K 7/00* (2006.01)
*A01K 7/06* (2006.01)

(52) U.S. Cl. .......................................... 119/72; 119/77
(58) Field of Classification Search ................ 119/52.2, 119/57.8, 57.9, 51.01, 72, 74, 77
See application file for complete search history.

(56) References Cited

U.S. PATENT DOCUMENTS

| 516,600 | A | * | 3/1894 | Higgins | 119/77 |
| 1,627,140 | A | * | 5/1927 | Bindemann | 119/77 |
| 5,062,388 | A | * | 11/1991 | Kilham | 119/52.2 |
| 7,000,566 | B2 | * | 2/2006 | Fort, II | 119/69.5 |
| 7,685,969 | B2 | * | 3/2010 | Stone et al. | 119/72 |
| 2007/0277738 | A1 | * | 12/2007 | Dentsbier | 119/77 |

* cited by examiner

*Primary Examiner*—Timothy D Collins
*Assistant Examiner*—Brian M O'Hara
(74) *Attorney, Agent, or Firm*—Jacobson Holman PLLC

(57) ABSTRACT

A liquid bird feed is provided with a liquid container having a sealable top opening and a bottom opening, a liquid tray adapted to immerse the bottom opening in liquid, and a valve mechanism adapted to close the bottom opening to enable the liquid container to be filled through the sealable top opening.

20 Claims, 4 Drawing Sheets

LIQUID BIRD FEEDER

This application is a continuation application of U.S. Ser. No. 11/434,020 filed May 15, 2006, to issue as U.S. Pat. No. 7,600,487 on Oct. 13, 2009, the priority of which is hereby claimed.

BACKGROUND OF THE INVENTION

1. Field of the Invention

The present invention is generally related to liquid bird feeders and, in particular, to such bird feeders which may be filled without immersion.

2. Description of the Prior Art

Liquid nectar bird feeders are used for specifically attracting hummingbirds in the same manner as seed feeders are used to attract other birds. Some may consider liquid nectar feeders to be less convenient however, because of the liquid auto-feed structure. Filling liquid feeders commonly requires inversion of the feeder and certain liquid spillage from this action.

It is therefore desirable to have a liquid nectar feeder which minimizes liquid spillage during filling and which even avoids inversion during filling.

SUMMARY OF THE INVENTION

In one embodiment of the present invention, a liquid bird feeder, comprises a liquid container having a sealable top opening and a bottom opening, a liquid tray adapted to immerse the bottom opening in liquid, and a valve mechanism adapted to close the bottom opening to enable the liquid container to be filled through the sealable top opening.

The liquid container may include a vertically oriented cylindrical extension forming the bottom opening. The liquid tray may include a vertically oriented cylindrical collar adapted to connect to the cylindrical extension of the liquid container. The cylindrical collar may include a cylindrical side wall having a liquid port located therein. The valve mechanism may include a rotatable cylindrical member having an opening adapted to selectively align and misalign with the port in the cylindrical collar to respectively open or close the port with rotation of the rotatable cylindrical member. The cylindrical collar may include a plurality of ports and the rotatable cylindrical member may include a corresponding plurality of openings adapted to simultaneously align or misalign with the plurality of ports for respectively opening and closing all of the plurality of ports simultaneously with rotation of the rotatable cylindrical member.

The rotatable cylindrical member may be adapted to be at least partially immersed in liquid within the liquid tray and may include an actuator which extends above the port in the cylindrical collar, and thus above a normal liquid level in the liquid tray. The liquid tray may include a tray cover having one or more feeding ports passing there through and a slot adapted to allow the actuator to be operable from outside of the tray cover to rotate the rotatable cylindrical member.

The liquid container may include a top cover adapted to seal the top opening.

BRIEF DESCRIPTION OF THE DRAWINGS

The present invention is illustratively shown and described in reference to the accompanying drawings, in which.

DETAILED DESCRIPTION OF THE PREFERRED EMBODIMENTS

Figure 1:
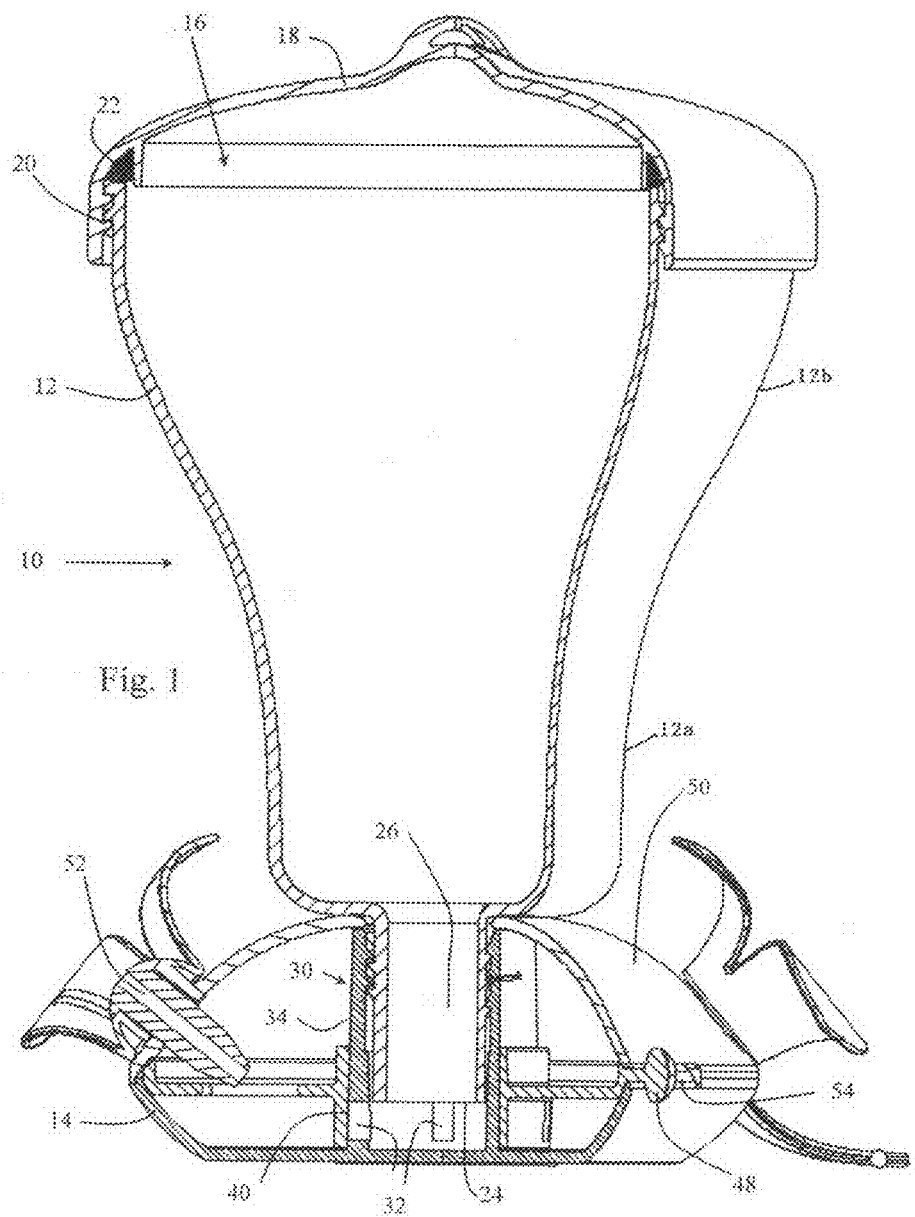
FIG. 1 is a sectional side view of a bird feeder constructed in accordance with one embodiment of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 generally shows a sectional side view of a bird feeder 10, which generally includes a reservoir or liquid container 12 and a liquid tray 14. Liquid container 12 includes a sealable top opening 16 having a cover 18 adapted to seal top opening 16. Cover 18 includes peripheral threads 20 adapted to engage liquid container 12 and an O-ring seal 22 located to create an air tight seal.

Figure 2:
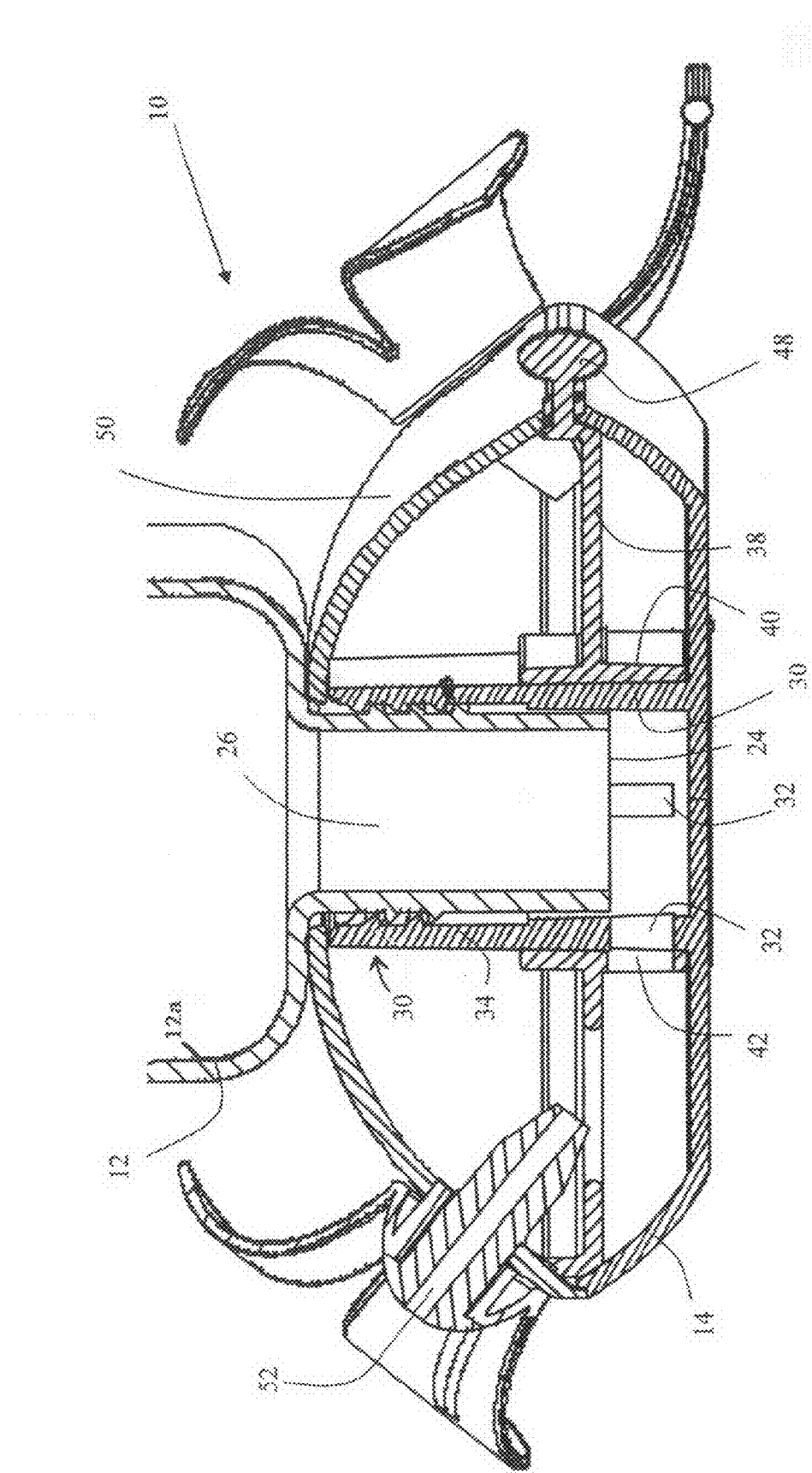
FIG. 2 is an enlarged, partial sectional, side view of the embodiment of FIG. 1, showing greater detail and having a component is located in a different operative position from the view of FIG. 1.

FIG. 2 shows an enlarged sectional side view of the lower portion of bird feeder 10. Liquid container 12 also includes a bottom opening 24 formed by a cylindrical extension 26 of the lower end 12a of liquid container 12. Bottom opening 24 and liquid tray 14 are oriented to immerse bottom opening 24 in liquid from liquid container 12. This arrangement allows a vacuum created in the upper end 12b of the liquid container 12 to retain liquid therein and automatically feed liquid into liquid tray 14 to the level of bottom opening 24.

Liquid tray 14 includes a vertically oriented, cylindrical collar 30, which extends upwardly and is adapted to engage cylindrical extension 26 of liquid container 12. Cylindrical collar 30 is axially closed at its lower end by formation with liquid tray 14, but includes one or more ports 32 formed in the cylindrical side wall 34.

Bird feeder 10 further includes a valve mechanism 38 including a rotatable cylindrical member 40. Cylindrical member 40 includes a one or more openings 42 adapted to either alight with a port 32 or misalignment in response to the rotation of valve mechanism 38 and rotatable cylindrical member 40. FIG. 2 shows opening 42 in alignment with a port 32 covered by a portion of rotatable cylindrical member 40, thus effecting closure of ports 32.

Figure 3:
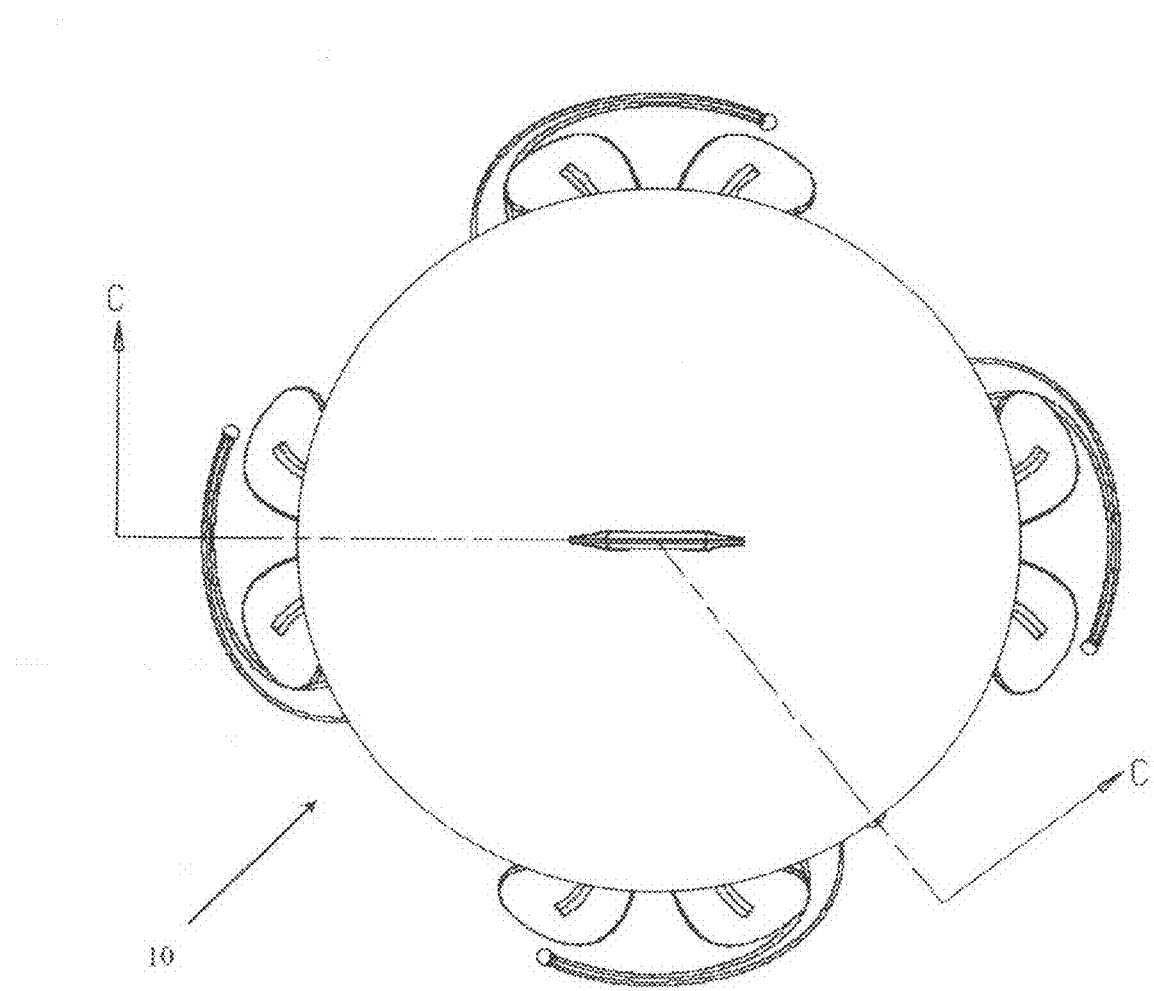
FIG. 3 is a top view of the bird feeder of FIGS. 1 and 2 showing approximate cross sectional cut lines used for FIGS. 1 and 2.

FIG. 3 shows the approximate cross section used for FIGS. 1 and 2. However, the angled leg of the cross section line C-C is slightly different between FIGS. 1 and 2, because the cross section passes through actuator handle 48, which is in different positions in FIGS. 1 and 2.

Figure 4:
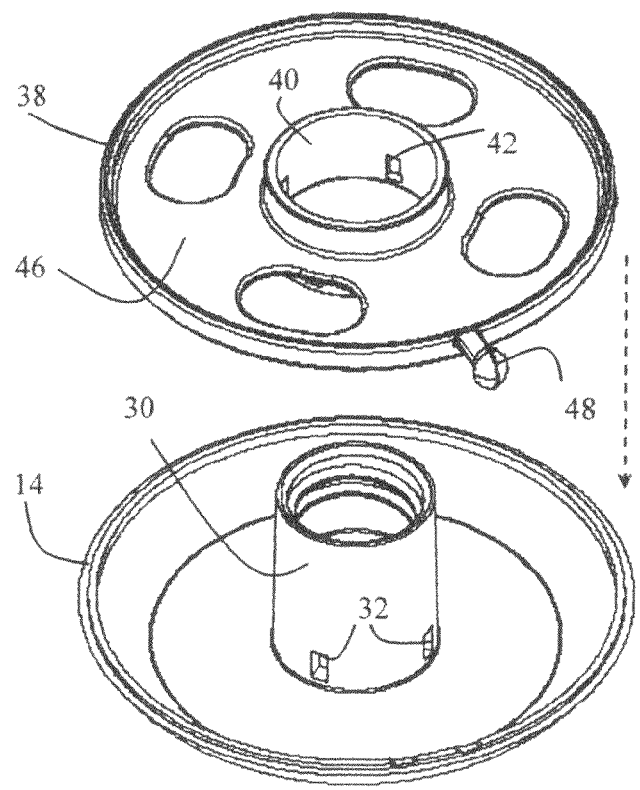
FIG. 4 is a perspective view of two components used in the bird feeder of FIGS. 1-3.
Figure 5:
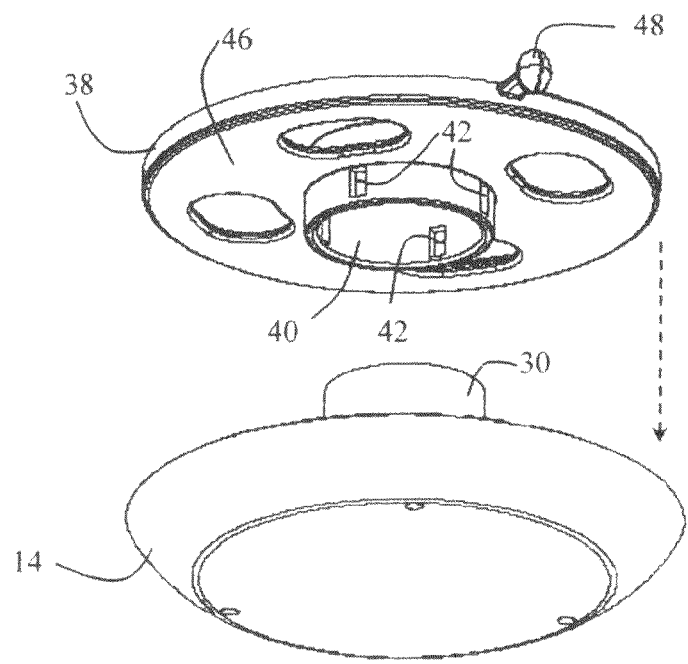
FIG. 5 is a different perspective view of the bird feeder components of FIG. 4.

FIGS. 4 and 5 show respective upper and lower perspective views of the liquid tray 14 and valve mechanism 38. FIG. 4 shows cylindrical collar 30 to have a plurality of ports 32, and FIG. 5 shows rotatable cylindrical member 40 to have a plurality of openings 42. Ports 32 and openings 42 are located at the same angular positions around the their respective cylindrical axes to cause simultaneous misalignment or alignment between all ports 32 and openings 42, thus allowing bottom opening 24 to be selectively closed or opened. Valve mechanism 38 further includes a circular disk 46 and an actuator handle 48, which are shown to extend above the level of port 32 in FIGS. 1 and 2. This enables activation of valve mechanism 38 even while there is liquid present in liquid tray.

Now returning to FIGS. 1 and 2, liquid tray 14 further includes a cover 50 adapted to substantially close liquid tray 14 and limit access to any liquid contents thereof. Cover 50 includes a plurality of bird feeder ports 52 adapted to allow access by long-beaked hummingbirds while simultaneously prevent access by bees. Cover 50 further includes a slot 54 to allow the actuator handle 48 to extend outside of liquid tray 14.

The unique construction of bird feeder 10 thus allows filling thereof without necessitating undesired dripping or spillage of liquid nectar.

It is now apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A top-fill liquid bird feeder for providing liquid nectar to hummingbirds, comprising:
   a liquid container configured to contain a volume of liquid nectar and having a sealable top opening and a bottom portion with a flow opening;
   a seal element adapted to close said top opening and with an airtight seal;
   a liquid tray configured to connect with said container bottom portion to allow liquid nectar from said container to flow into said tray through said flow opening so that a vacuum is created in an upper end of said liquid container to retain liquid in said container when the top opening is sealed by the seal element, said liquid tray having a cover and including at least one feeding port through which hummingbirds can access the liquid nectar in said tray; and
   a valve mechanism including a control member movable in a substantially horizontal plane to selectively open and close said flow opening through which liquid in said container flows into said liquid tray, closure of said flow opening by said valve mechanism enabling said liquid container to be filled by removing said seal element and adding liquid nectar through said top opening while, at the same time, blocking leakage of any remaining nectar still in said liquid container through said flow opening when the vacuum in the upper end is lost upon removal of said seal element.

2. The top-fill liquid bird feeder of claim 1, wherein said tray includes an attaching element configured to connect said tray to said liquid container.

3. The top-fill liquid bird feeder of claim 2, wherein said attaching element includes at least one liquid port that is aligned and misaligned with at least one liquid port in said movable member to respectively open and close said flow opening upon horizontal movement of said movable member.

4. The top-fill liquid bird feeder of claim 1, wherein said movable member includes at least one liquid port that is aligned and misaligned with said flow opening in said liquid container to respectively open and close said flow opening upon horizontal movement of said movable member.

5. The top-fill liquid bird feeder of claim 2, wherein said attaching element includes a collar adapted to receive the bottom portion of said liquid container.

6. The top-fill liquid bird feeder of claim 5, wherein said collar is axially closed at a lower end thereof by said liquid tray.

7. The top-fill liquid bird feeder of claim 5, wherein said bottom portion of said liquid container includes a vertically oriented extension that is received within said collar.

8. The top-fill liquid bird feeder of claim 1, wherein said liquid tray includes a tray cover adapted to substantially close said liquid tray, said feeding port passing through said cover with a narrow elongated passageway that is sized to allow access by long-beaked hummingbirds while preventing access by bees, liquid in said liquid tray being accessible to hummingbirds only through said feeding port when said feeder is in use.

9. The top-fill liquid bird feeder of claim 1, wherein said movable member is rotatable around a vertical axis.

10. The top-fill liquid bird feeder of claim 9, wherein said movable member includes a sidewall having at least one port adapted to selectively align and misalign with said flow opening for respectively allowing and preventing flow of liquid from said container into said liquid tray when said movable member is rotated around said vertical axis.

11. The top-fill liquid bird feeder of claim 10, wherein said movable member is adapted to be at least partially immersed in liquid within said liquid tray and includes an actuator which extends above a normal liquid level in said liquid tray.

12. The top-fill liquid bird feeder of claim 11, wherein said liquid tray includes a tray cover through which said feeding port passes, said tray cover having a slot adapted to allow said actuator to be operable from outside of said tray cover to rotate said movable member.

13. A top-fill liquid hummingbird feeder, comprising:
   a liquid container for receiving hummingbird nectar through a sealable top opening and dispensing said nectar through a bottom opening;
   a container cover adapted to engage said liquid container to close said top opening and create an airtight seal therewith;
   a covered liquid tray defining an enclosure accessible by at least one feeding port and adapted to immerse said bottom opening in said nectar and thereby allow a vacuum created in said liquid container to retain liquid in said container when the top opening is sealed by the cover,
   an attaching element for securing said container to said covered liquid tray; and
   a valve mechanism movable in a substantially horizontal plane to open and close said bottom opening by manipulating an element outside of said enclosure, closure of said bottom opening enabling said liquid container to be filled with nectar through said sealable top opening when said cover is removed while retaining any remaining nectar still in said liquid container.

14. The hummingbird feeder of claim 13, wherein said valve mechanism includes an opening therein adapted to be selectively aligned and misaligned with said bottom opening to respectively open and close said bottom opening upon movement of said member.

15. The hummingbird feeder of claim 13, wherein said valve mechanism includes a rotatable member having a port therein adapted to be selectively aligned and misaligned with said bottom opening to respectively open and close said bottom opening upon rotation of said member around a vertical axis, at least a part of said rotatable member being contained within said liquid tray and covered by said liquid tray cover.

16. The hummingbird feeder of claim 15, wherein said rotatable element includes an outwardly extending elongated actuating member to facilitate rotation of said rotatable member by a user, said actuating member also rotating around said vertical axis.

17. A method of filling a top-fill hummingbird feeder having a liquid container configured to contain a volume of liquid nectar, said liquid container including a top opening closable with a seal element to create an airtight seal and a bottom portion with a flow opening, a liquid tray adapted to immerse the flow opening in liquid to allow a vacuum created in an upper end of said liquid container to retain liquid in said container when the top opening is closed by the seal element, said tray including an attachment element configured to connect said tray to said liquid container, said liquid tray having a cover and including at least one feeding port through which hummingbirds can access the liquid nectar in said tray, and a valve mechanism including a movable control member to selectively open and close said flow opening, said method comprising the steps of:

placing and retaining the bird feeder in a substantially vertical orientation;

moving said control member to a first position to close said flow opening, closure of said flow opening by said valve mechanism enabling said liquid container to be filled while blocking leakage of any remaining nectar still in said liquid container through said flow opening when the vacuum in the upper end is lost upon removal of said seal element;

removing said seal element, causing loss of the vacuum in the upper end of the container;

adding a desired amount of liquid nectar to said container through said top opening while said valve mechanism's closure of said flow opening prevents nectar from leaking out of the liquid container;

sealing said top opening with said seal element; and moving said control member to a second position to open said flow opening which allows nectar to flow from said container into said liquid tray until said flow opening is immersed in said nectar at which time a vacuum is created in said liquid container upper end which prevents additional nectar from flowing into said liquid tray.

18. The method as set forth in claim 17, wherein the steps of moving said control member to a first position and to a second position include moving said control member in a substantially horizontal plane.

19. The method as set forth in claim 18, wherein the steps of moving said control member to a first position and to a second position include rotating said control member around a substantially vertical axis.

20. The method as set forth in claim 17, wherein said control member includes an actuator that is operable from outside said liquid tray, said steps of moving said control member to a first position and to a second position including manually grasping the actuator by a user to rotate said control member in a substantially horizontal plane.

* * * * *